INVENTORS: G. A. BARAFF
S. J. BUCHSBAUM
C. C. GRIMES
BY Sylvan Sherman
ATTORNEY

April 11, 1967 G. A. BARAFF ET AL 3,314,019

HELICON WAVE PLASMA AMPLIFIER

Filed March 25, 1965

3 Sheets-Sheet 2

April 11, 1967 G. A. BARAFF ET AL 3,314,019

HELICON WAVE PLASMA AMPLIFIER

Filed March 25, 1965 3 Sheets-Sheet 3

United States Patent Office 3,314,019
Patented Apr. 11, 1967

3,314,019

HELICON WAVE PLASMA AMPLIFIER

Gene A. Baraff, Berkeley Heights, Solomon J. Buchsbaum, Morristown, and Charles C. Grimes, Berkeley Heights, N.J., assignors to Bell Telephone Laboratories, Incorporated, New York, N.Y., a corporation of New York Filed Mar. 25, 1965, Ser. No. 442,620
8 Claims. (Cl. 330—5)

This invention relates to helicon wave amplifiers.

It is known that a one-component plasma, when subjected to a magnetic field, will propagate electromagnetic waves known as "helicon" waves. (See "Macroscopic Theory of Helicons," by C. R. Legendy, Physical Review, volume 135, No. 6A, September 14, 1964, pages A1713–A1724, and the references cited therein.) It is known that there is a surface wave associated with each bounding surface of the plasma supporting material in addition to the helicon wave in the bulk of the plasma material.

Wave propagation through a single-component plasma is accompanied by loss. Efforts to produce gain by providing a drift current to interact with the signal wave, in the manner similar to traveling wave tube, fail because of the inherent inability to produce a drift current in the plasma whose velocity is equal to or greater than phase velocity of the signal wave. This comes about because the drift velocity of the carriers tends to augment the phase velocity of the signal wave in such a way that the wave always outruns the carriers.

It is, accordingly, a broad object of the present invention to produce helicon wave amplification in one component plasmas.

In accordance with the invention, helicon wave amplification is obtained in a composite structure comprising at least two, dissimilar, one-component plasma supporting materials, sharing a common interface. It has been discovered that under the influence of parallel magnetic and electric fields, directed parallel to the interface, amplification is realized when the differential drift current through the two plasmas exceeds a critical value. It is a unique characteristic of a plasma amplifier of the type described, that amplification is obtained notwithstanding the fact that the drift current velocities in the plasmas are less than the phase velocity of the signal wave.

Figure 1:
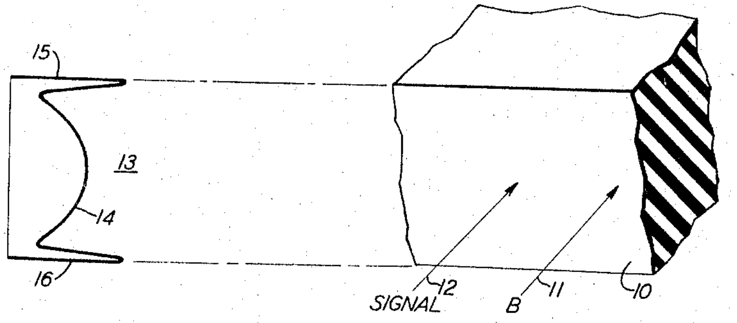
Figure 2:
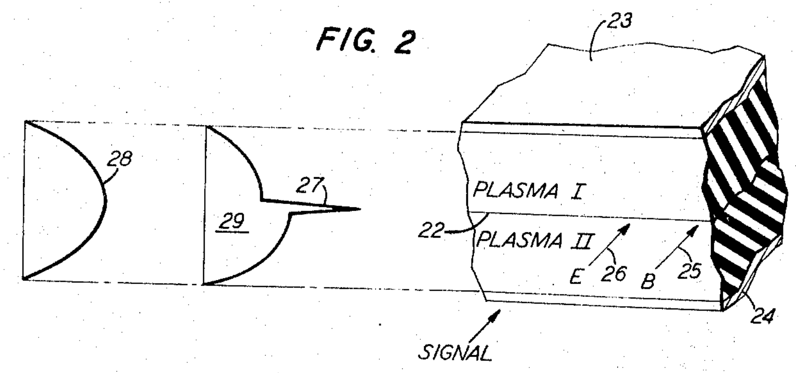
Figure 3:
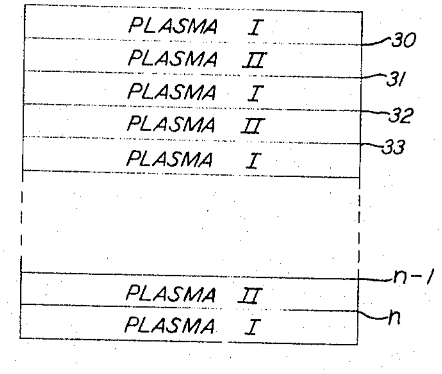

These and other objects and advantages, the nature of the present invention, and its various features, will appear more fully upon consideration of the various illustrative embodiments now to be described in detail in connection with the accompanying drawings, in which:

FIG. 1, given for purposes of explanation, shows the electric field distribution in a one-component plasma supporting medium subject to a magnetic field;

FIG. 2, given for purposes of explanation, shows the electric field distribution in two abutting plasma supporting media under different operating conditions;

FIG. 3 shows an arrangement for obtaining a plurality of plasma-plasma interfaces; and FIGS. 4 through 7 shows various illustrative embodiments of a plasma amplifier in accordance with the invention.

Referring to FIG. 1, there is shown a single-component plasma supporting medium 10 through which there is applied a steady magnetic field B, represented by the vector 11. The term "one-component" or "single-component" indicates that there is only one significant type of charge carrier present in the plasma, or, if more than one is present, only one predominates in its effect on helicon wave propagation. Examples of single-component plasma materials are given by Legendy in the above-cited article and include doped semiconductors, certain metals and alloys of semimetals.

It is known that such a plasma, suitably biased by means of a magnetic field, will propagate electromagnetic waves in a direction parallel to the magnetic field, as indicated by the signal vector 12. The conditions under which such waves, called helicon waves, can propagate are given by $$\omega_c\tau >> 1 \quad (1)$$

$$\omega/\omega_c << 1 \quad (2)$$

and $$K \equiv \omega_p^2/\omega\omega_c >> 1 \quad (3)$$

where $\omega_c$ is the cyclotron frequecny of the carriers, $\tau$ is the scattering time of the carriers, $\omega$ is the frequency of the helicon wave (i.e., the signal wave), and $\omega_p$ is the plasma frequency.

The quantity K is in the nature of a dielectric constant in the sense that the phase velocity of the helicons is less than the speed of light by the factor $K^{1/2}$.

The helicons are circularly polarized waves whose sense of rotation about the magnetic field direction is in the same sense as that of the charge carriers.

In addition to bulk helicon waves, there is a second type of wave generated whose presence is required to satisfy the boundary conditions along the surfaces of the plasma supporting material parallel to the magnetic field. These waves, referred to as surface, or boundary waves, propagate in the same direction as the bulk helicons and are characterized by an amplitude distribution which exponentially decays in a direction transverse to the magnetic field. The attenuation length for these waves is approximately equal to the helicon wavelength $\lambda_h$ divided by $\omega_c\tau$.

The distribution of electric field strength across the plasma is represented by curve 13 in FIG. 1. This curve includes the effects of the two propagating wave components. The sine component 14 of the curve represents the contribution of the bulk helicon wave. This curve would be flat and constant in a plasma of infinite extent. The sinusoidal distribution is a consequence of the finite thickness of the sample.

The spikes 15 and 16 at each end of curve 13 represent the electric field contribution of the surface waves.

The surface waves have the interesting feature that, when the product $\omega\tau$ is less than unity, they give rise to an energy loss which approaches a finite value as the product $\omega_c\tau$ approaches infinity. This comes about because the amplitude of the surface wave is proportional to $\omega_c\tau$, while the distance they extend from the boundary is proportional to $l/\omega_c\tau$.

The power loss W experienced by a helicon wave is equal to one-half the real part of the integral of the dot product of the electric field $\bar{e}$ and the complex conjugate of the current $\bar{j}^*$. That is $$W = \tfrac{1}{2} Re \int \bar{e} \cdot \bar{j}^* dv \quad (4)$$

where $\bar{e}$ is the complex electric field equal to the sum of the bulk helicon field, $\bar{e}_b$ and the surface wave field $\bar{e}_s$, and $\bar{j}$ is the complex current equal to the sum of the bulk helicon current $\bar{j}_b$ and the surface wave current $\bar{j}_s$.

Thus, the power loss can be regarded as resulting from bulk wave-bulk wave interaction, bulk wave-surface wave interaction and surface wave-surface wave interaction. For large values of $\omega_c\tau$, the bulk-bulk term becomes negligibly small so that it is the other two terms that lead to significant attenuation of the signal wave.

It has been discovered that if two dissimilar, single-component plasma supporting media are placed adjacent to each other, a surface wave is generated at the plasma-plasma interface whose properties can be controlled in a manner to produce net helicon wave gain. Such an arrangement of plasma supporting media is illustrated in FIG. 2, which includes a first plasma material I and a second plasma material II which share a common boundary or interface 22. To simplify the analysis, conductive sheets 23 and 24 have been placed adjacent to the upper boundary of plasma I and the lower boundary of plasma II for the purpose of short circuiting the surface waves which would normally be present at these interfaces. It should be noted, however, that these conductive sheets are not required for the operation of the device to be described, but are included at this time solely for the purpose of simplifying the analysis of this operation.

Each of the plasmas, when subjected to a magnetic field B, indicated by the vector 25, is capable of supporting helicon waves in the manner described hereinabove with reference to FIG. 1. Because the two plasmas are different, however, their dielectric constants $K_1$ and $K_2$ are different. The common surface wave at the plasma-plasma interface 22, which is required to satisfy the boundary conditions in both plasmas, has an amplitude which is proportional to $(K_1-K_2)$ and the associated power loss is proportional to $(K_1-K_2)^2$.

If now a static electric field is impressed across the plasma materials in a direction parallel to the magnetic field, a current is caused to flow through each of the plasmas, resulting in a change in the dielectric constants of the plasmas. In FIG. 2, the electric field E is indicated by the vector 26. Generally, the strength and direction of the electric field can be made different on the two sides of the interface.

The presence of a current in each of the plasmas produces a change in the dielectric constant from the no-current value K, to a new value X where $$X_1=K_1\left(1-\frac{V_1}{V_\phi}\right) \quad (5)$$

and $$X_2=K_2\left(1-\frac{V_2}{V_\phi}\right) \quad (6)$$

where $V_1$ and $V_2$ are the drift velocities of the carriers constituting the current in each of the respective plasmas, and $V_\phi$ is the phase velocity of the helicon wave in the composite structure and is itself a function of $V_1$ and $V_2$.

The new dielectric constants $X_1$ and $X_2$ are referred to as "Doppler-shifted" dielectric constants and are of particular significance in connection with the present invention as will be explained hereinbelow.

In the presence of drift currents in the plasmas, the amplitude of the surface wave changes, as it is now proportional to $(X_1-X_2)$ which is a function of the drift currents. Thus, by forcing current through both or one of the plasmas, the amplitude of the surface wave can be controlled. It is apparent that as $X_1$ and $X_2$ approach a common value, the amplitude of the surface wave decreases, and can be reduced to zero when $X_1=X_2$. For this condition the surface wave is eliminated and with it the associated loss also disappears. A further differential change in current beyond the value for which $X_1=X_2$, results in a reappearance of a surface wave of reversed phase. In this condition, all the fields and currents associated with the surface wave are in the opposite direction. The phase of the fields and currents associated with the bulk helicon waves, however, does not reverse. As a consequence, the bulk wave-surface wave interaction, which previously represented a power loss, now constitutes a power gain. The surface wave-surface wave interaction, however, remains lossy. Nevertheless, it can readily be shown that when the phase of the surface wave reverses, the available gain produced can be made large enough to overcome the losses in the system, and that the available gain is proportional to $(X_1-X_2)(K_1-K_2)$.

FIG. 2 shows the electric field distribution across the plasmas for different operating conditions. Curve 29 illustrates the general distribution including the spike 27 associated with the surface wave at the plasma-plasma interface 22. As noted above, the spike exists when $X_1\neq X_2$. For the special conditions for which $X_1=X_2$, the surface wave vanishes and the bulk helicon wave stretches across the composite plasma structure as if it were all one medium as indicated by curve 28 in FIG. 2.

It should be noted that the conductive sheets 23 and 24, included initially for the purpose of simplifying the analysis by eliminating surface waves at the outer boundaries of the amplifier, serve additionally to reduce the losses in the system by eliminating the losses associated with these boundary waves. Thus, conductive sheets are advantageously included in any embodiment of the invention in which it is practical to do so.

It is apparent that the differential threshold drift velocity can be kept small by starting with materials for which $K_1$ and $K_2$ are nearly equal. However, since the power gain is proportional $(K_1-K_2)$, such a design would buy a low threshold current at the cost of low amplification. The design of the amplifier and the selection of materials would, therefore, take into consideration the desired gain.

For purposes of illustration, let us design an amplifier to operate at approximately 0.2 gc./sec. ($\omega=1.2\times10^9$ rad./sec., $\lambda_o=150$ cm.) and which comprises three slabs of PbTe. The outer two slabs have one carrier concentration, and the inner slab has a second carrier concentration which differs from that of the outer slabs. Conductive sheets, as illustrated in FIG. 2, are in contact with the outer surfaces of the outer slabs. The thickness of the inner slab is denoted by $2r$, the thickness of each outer slab will be denoted by $R-r$ so that the three slabs together have a combined thickness of 2R. In this illustrative example, the electric field is applied to the inner slab only. The dielectric constant of the material comprising the inner slab is designated by $K_1$, and the dielectric constant of the material comprising the two outer slabs is designated by $K_2$.

One can calculate, using well-known techniques (see see Allis, Buchsbaum and Bers, "Waves in Anisotropic Plasmas," Massachusetts Institute of Technology Press, Cambridge, Massachusetts, 1963) that such a structure, when placed in a magnetic field, propagates electromagnetic waves which can be described by a complex propagation constant $k=k_r+ik_i$ and a real frequency $\omega$. It can be shown that the propagation characteristics can be expressed somewhat more simply when lengths are expressed in units of $\lambda_h=\lambda_o/\sqrt{K_2}$, where $\lambda_h$ is the helicon wavelength in a large slab of the outer material, and when velocities are expressed in units of $V_h=C/\sqrt{K_2}$, where $V_h$ is the helicon phase velocity in a large slab of the outer material. The complex propagation constant $k$ can now be expressed in terms of the length unit $\lambda_h$ as $$k=2\pi\beta/\lambda_h$$

where $\beta$ is a complex, dimensionless number which when known, determines $k$. Similarly, the thickness of the slabs can be expressed in terms of the length unit $\lambda_h$ as $$R=T\lambda_h$$
$$r=\rho R$$

where T and $\rho$ are also dimensionless numbers. Similarly, the drift velocity $V_d$ can be expressed in terms of the velocity unit $V_h$ as $$V_d=uV_h$$

The dielectric constant $K_1$ is conveniently written as a dimensionless multiple of $K_2$ as $$K_1=\xi K_2$$

The reason for defining $\beta$, T, $\rho$, $u$ and $\xi$ here is that it can be shown that in the limit of very high $\omega_c\tau$, the quantity $\beta$ depends only on T, $\rho$, $u$ and $\xi$. As an example relevant to the present illustration, one can calculate that for the particular arbitrarily selected values $$T=1.58$$
$$\rho=0.1$$
$$u=-0.58$$
$$\xi=0.8$$

the complex number $\beta$ is $$\beta=\beta_r+i\beta_i=0.061+i\times 3\times 10^{-4}$$

The significance of $\beta$ is that the ratio $\beta_i/\beta_r$ is a measure of the spatial growth of the signal per wavelength.

Helicon waves propagating in a bulk medium with finite $\omega_c\tau$ suffer a spatial attenuation per wavelength which, in this same terminology, would be measured by $\frac{1}{2}\omega_c\tau$. In order then that the available gain be sufficient to overcome the finite losses, it is necessary to have $$\frac{1}{2\omega_c\tau}<\beta_i/\beta_r\approx 5\times 10^{-3}$$

or $$\omega_c\tau>100$$

Samples of PbTe can be prepared with carrier concentrations N in the neighborhood of $N=3\times 10^{17}$ carriers/cm.$^3$. At liquid helium temperature, this material has a mobility of $\mu=3\times 10^6$ cm.$^2/V$ sec. and is capable of sustaining for limited periods of time, a carrier drift velocity $V_d$ of $5\times 10^6$ cm./sec. The electric field E required to produce this drift velocity is $$E=V_d/\mu=5\times 10^6/3\times 10^6=1.7V/\text{cm.}$$

Under this condition, the helicon velocity $V_h$ is $$V_h=V_d/u=5\times 10^6/0.58=8.6\times 10^6 \text{ cm./sec.}$$

This requires an outer medium dielectric constant $K_2$ $$K_2=C^2/V_h^2=(3\times 10^{10}/8.6\times 10^6)^2=1.22\times 10^7$$

The quantity $\omega_c\tau$ is related to the mobility and the magnetic field B by $\omega_c\tau=\mu B\times 10^{-8}$, so, to achieve an $\omega_c\tau$ of 150, comfortably more than the minimum value of 100, the field required is $$B=10^8\omega_c\tau/\mu=10^8\times 150/3\times 10^6=5 \text{ kgauss}$$

With a carrier density $N=3\times 10^{23}$ carriers/m.$^3$, the ratio $$\omega_p^2/\omega_c=(Ne^2/m\epsilon_o)/(eB/m)\times 10^4=(Ne/\epsilon_o B)\times 10^4$$

is $$\frac{3\times 10^{23}\times 1.9\times 10^{-19}}{9\times 10^{-12}\times 5\times 10^3}\times 10^4=1.3\times 10^{16}$$

Thus, the operating frequency $\omega$ is $$\omega=\omega_p^2/K_2\omega_c=\frac{1.3\times 10^{16}}{1.2\times 10^7}=1.1\times 10^9 \text{ rad./sec.}$$

The dielectric constant $K_1=0.8K_2$ can be achieved by making the carrier concentration in the inner slab 0.8 times that in the outer slab. The helicon wavelength $\lambda_h$ is then $$\lambda_h=\lambda_o/\sqrt{K_2}$$
$$\lambda_h=150/35\times 10^3=.042 \text{ cm.}$$

Thus, the half width of the structure would be $$R=T\lambda_h=1.58\times .042=.068 \text{ cm.}$$

and the half width of the inner slab is $$r=\rho r=0.1\times .068=6.8\times 10^{-3} \text{ cm.}$$

The gain for such an amplifier is 0.135 db/cm. It can, of course, be increased by increasing the drift velocity.

Before proceeding with the description of a number of illustrative embodiments, the following points are noted and emphasized. The first is that the dielectric constants of the two plasmas can be independently adjusted to produce gain by passing current through either or both of the plasmas. As explained above, the amplitude of the surface wave is proportional to the difference in dielectric constants of the adjacent plasmas. The gain threshold is reached when the dielectric constants are made equal. This equality can be reached by either passing currents through both plasmas of sufficient amplitude to make the resulting Doppler-shifted dielectric constants $X_1$ and $X_2$ equal, or by causing a current to flow through only one of the plasmas so as to make the Doppler-shifted dielectric constant $X_1$ of that one plasma equal to the unmodified dielectric constant $K_2$ of the other plasma. It is also to be noted that the direction of current flow, which can be independently selected, determines whether the doppler-shifted dielectric constant X is greater than or less than the no-current dielectric constant K. Thus, there is substantial freedom in selecting the manner of adjusting the dielecrtic constants of the plasma in that the current-producing electric field can be applied to either plasma, or to both plasmas in the same direction or in opposite directions.

The second point to be noted is that the composite plasma structure is not limited to two plasmas and a single interface, or to any particular number of plasmas. As illustrated in FIG. 3, a plurality of interfaces 30, 31 . . . $n-1$, $n$ can be obtained by simply adding alternate layers of different plasma materials I and II.

FIGS. 4 to 7 show four illustrative embodiments of the invention, it being recognized that other arrangements will be obvious to those skilled in the art.

Figure 4:
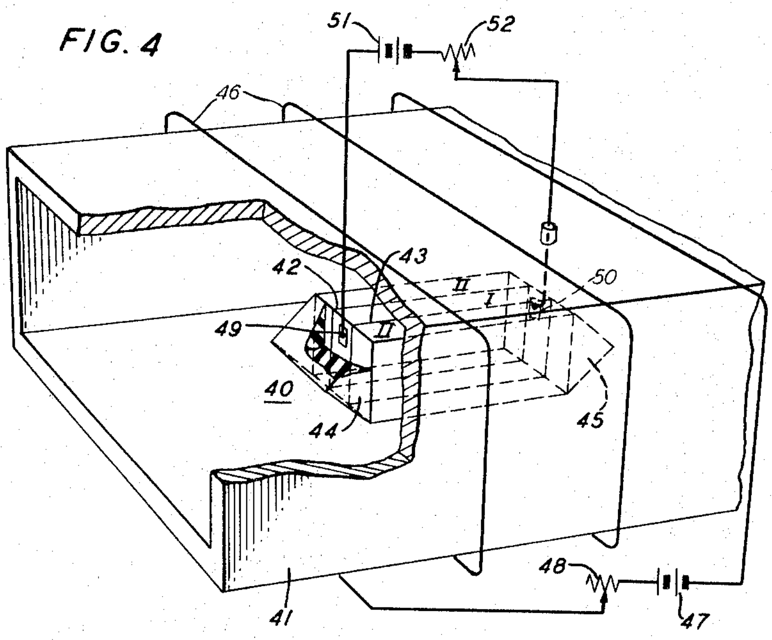

In the embodiment of FIG. 4, a three plasma amplifier 40, comprising a first plasma material I, sandwiched between two other plasma materials II, different than material I, is placed within a rectangular waveguide 41 with the plasma-plasma interfaces 42 and 43 parallel to the narrow walls of the guide. The plasma materials comprise any single-component plasma supporting media, which can be either semiconductors, semimetal alloys, metals, or combinations thereof. To facilitate coupling between the wave energy propagating in the waveguide mode and the helicon waves in the plasmas, tapered dielectric transition members 44 and 45 are placed at the input and output ends, respectively, of amplifier 40. Alternatively, each of the coupling members 44 and 45 can comprise an element of plasma material in which the carrier concentration monotonically increases from a minimum at its outermost end to a concentration that is of the same order of magnitude as the carrier concentration within materials I and II as its innermost end. In this latter arrangement the coupling members need not be physically tapered.

Coupling between the linearly polarized wave energy propagating in the rectangular waveguide and the circularly polarized helicon wave can be further improved by including a linear-to-circular mode converter (not shown) between the rectangular waveguide and the helicon wave amplifier.

A longitudinal, steady state magnetic field is applied to the plasmas by means of a coil 46 wound about that portion of waveguide 41 within which the plasma materials are located. Coil 46 is energized through a current controlling potentiometer 48. Obviously, other means well known in the art can be employed to control the amplitude of the current in coil 46.

A longitudinal drift current is established in the center plasma I by means of electrodes 49 and 50 connected at opposite ends of plasma material 43. The electrodes are energized by means of a direct current source 51 which is connected to the electrodes through a potentiometer 52. The potenitometer 52 is adjusted to permit a current flow in plasma I which exceeds the threshold current as explained hereinabove.

As also explained hereinabove, the threshold drift velocity, $V_t$, in plasma I is the drift velocity for which the Doppler-shifted dielectric constant, $X_1$, of plasma I equals the unmodified dielectric constant, $K_2$, of plasma II. That is $$X_1=K_2$$

From equation (5)

$$X_1=K_1\left(1-\frac{V_t}{V_\phi}\right)=K_2$$

The voltage E necessary to establish this drift velocity can be calculated from $$V_t=\mu E$$

where $\mu$ is the carrier mobility and E the voltage per unit length applied to plasma I.

The critical current per unit area, $i_c$, is given by $$i_c=V_t eN$$

where $e$ is the carrier charge, and N the carrier concentration per unit volume.

To confine the drift current within plasma I, the plasma materials are advantageously separated by means of thin insulating layers which extend along the interfaces 42 and 43.

The alignment of the plasma-plasma interfaces parallel to the narrow walls of the waveguide, as shown in FIG. 4, is not a requirement. Thus, in the illustrative embodiment of FIG. 5, the plasma materials 55, 56 and 57 are placed within a rectangular waveguide 60 with the plasma-plasma interfaces 61 and 62 aligned parallel to the wide walls of the waveguide. The matching wedges, and the magnetizing coil are not shown in FIG. 5. However, it is understood that these features, or their equivalent, would be included in the manner well known in the art.

Figure 5:
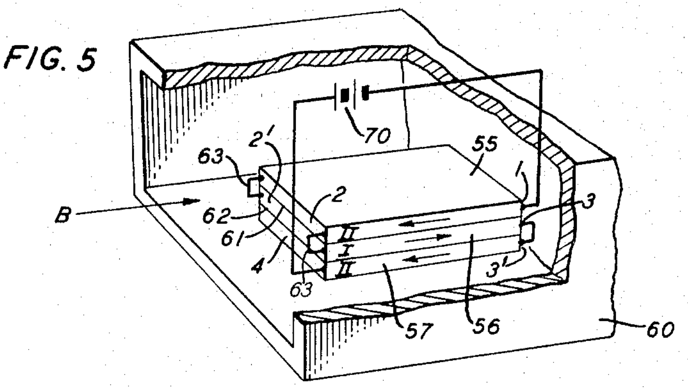

The embodiment of FIG. 5 does, however, include an alternate arrangement for providing a drift current in the plasmas. As indicated, hereinabove, the plasma materials are conductively insulated from each other along each interface. In FIG. 5, a drift current is established in each of the plasmas by conductively connecting the plasma materials in series with each other, and applying an electric potential across the entire series-connected assemblage.

Referring more particularly to FIG. 5, one end of a direct current source 70 is connected to end 1 of the top plasma material 55. The other end 2, of the top plasma material 55, is conductively connected to the adjacent end 2' of the center plasma material 56. This can be accomplished by means of conductive connector 63, or the insulating material between plasma materials can be ended short of the plasma material ends, allowing for a region of contact between adjacent ends of the appropriate plasma materials. In a similar fashion, end 3 of plasma material 56 is conductively connected to adjacent end 3' of the lower plasma material 57. The other end 4 of the lower plasma material 57 is connected to the other end of source 70.

Connected in this manner, an equal current flows through each of the plasmas. However, the currents in the two outer plasmas II flow in the same direction which is opposite to the direction of current flow in the inner plasma I. Thus, the dielectric constant for one of the plasma types is Doppler-shifted up, whereas the dielectric constant for the other plasma type is Doppler-shifted down. By adjusting the amplitude of this current, the necessary condition to produce amplification can be realized.

It is also to be noted that since the drift velocity is a function of the current density in the plasma, the resulting Doppler-shifted dielectric constant can be controlled by selecting the thickness of the various layers of material.

Figure 6:
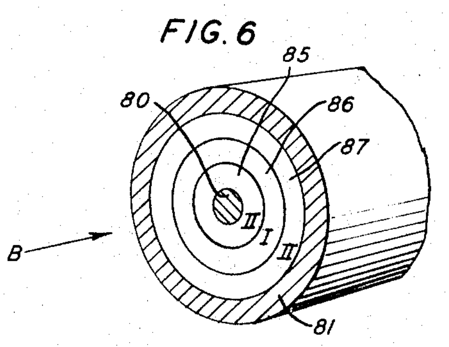

The embodiments of FIGS. 4 and 5 illustrate the invention in association with rectangular waveguides. However, other types of transmission media, such as circular waveguides, strip transmission lines and coaxial cables can just as readily be used. For example, in FIG. 6 the invention is illustrated in connection with a coaxial cable. In this embodiment, the plasma materials comprise a plurality of coaxial cylinders 85, 86 and 87 disposed between the inner conductor 80 and the outer conductor 81 of the coaxial line. In all other respects the amplifier of FIG. 6 is the same as those described above in that means are provided for magnetically and electrically biasing the plasma materials to produce amplification of the helicon signal wave propagating along the cylinders.

Figure 7:
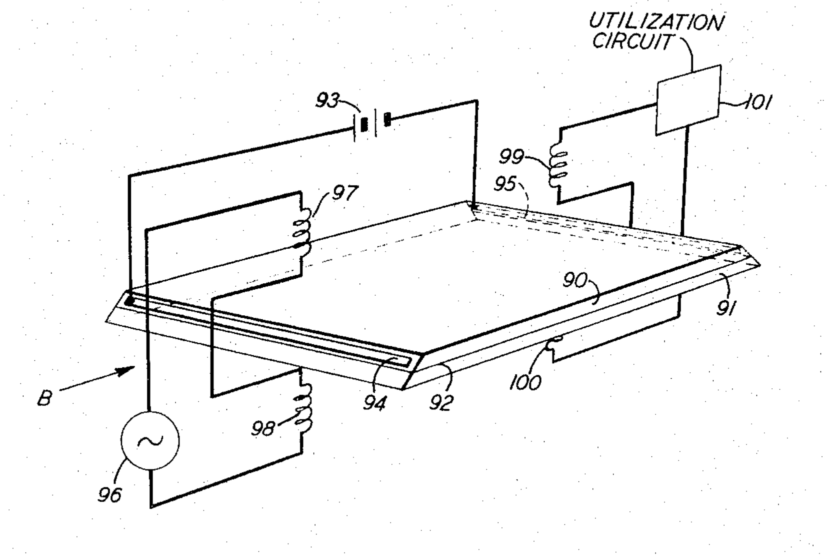

At lower frequencies at which lumped circuit components are typically employed, the arrangement of FIG. 7 is advantageously utilized. As in the other embodiments, the amplifier comprises at least two abutting slabs 90 and 91 of dissimilar plasma supporting materials, subjected to a steady magnetic field B, directed parallel to the plasma-plasma interface 92. Means for producing an electric current along at least one of the materials is provided by a source 93 of direct current conductively connected to opposite ends of material 90 by electrodes 94 and 95.

Signal wave energy is coupled to the amplifier from a signal source 96 by means of a pair of series-connected input coils 97 and 98 which are located on opposite sides of one end of the amplifier. Similarly, amplified signal wave energy is extracted from the amplifier by means of a second pair of series-connected coils 99 and 100 located at the output end of the amplifier. Coils 99 and 100 are connected in turn to a utilization circuit 101.

The ends of slabs 91 and 92 are advantageously inclined at an angle of 45 degrees with respect to the direction of wave propagation in the manner described in the copending application by C. A. Nanney, Ser. No. 389,148, filed Aug. 12, 1964.

In the various illustrative embodiments herein described, layers of two dissimilar materials have been used to form the plasma-plasma interfaces. It is apparent, however, that the invention is not limited to such arrangements. For example, helicon amplifiers using layers of three dissimilar materials can just as readily be constructed. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A helicon wave amplifier comprising:
two dissimilar one-component plasma supporting media disposed adjacent to each other to define a plasma-plasma interface;
means for coupling an electromagnetic signal into one end of said media;
means for establishing a steady magnetic field through said media in a direction parallel to said interface;
means for producing a current in at least one of said media in a direction substantially parallel to said interface characterized in that the differential drift current through the two media exceeds the critical value above which signal amplification occurs;
means for coupling an amplified electromagnetic signal out of the other end of said media.

2. A helicon wave amplifier comprising:
a plurality of alternate layers of two dissimilar, one-component plasma supporting media defining a plurality of parallel plasma-plasma interfaces between adjacent layers;
means for coupling an electromagnetic signal into one end of said media;
means for establishing a steady magnetic field through said media in a direction parallel to said interfaces;
means for producing current flow in layers of at least one of said types of media in a direction parallel to said interfaces characterized in that the differential drift current through said two dissimilar media exceeds the critical value above which signal amplification occurs;

and means for coupling an amplified electromagnetic signal out of the other end of said media.

3. A helicon wave amplifier comprising:

a first one-component plasma supporting medium characterized by a first dielectric constant;

a second one-component plasma supporting medium characterized by a second dielectric constant greater than said first dielectric constant;

said media disposed adjacent to each other to define a plasma-plasma interface;

means for establishing a steady magnetic field through said media in a direction parallel to said interface;

means for inducing a current flow through at least one of said media of sufficient intensity to make the Doppler-shifted dielectric constant of said first plasma greater than the Doppler-shifted dielectric constant of said second plasma;

and means for applying electromagnetic wave energy to, and extracting electromagnetic wave energy from said amplifier.

4. The amplifier in accordance with claim 3 wherein the dielectric constants $K_1$ and $K_2$ of said plasmas are given by $$K_1=\frac{\omega_{p1}^2}{\omega\omega_{c1}}$$

and $$K_2=\frac{\omega_{p2}^2}{\omega\omega_{c2}}$$

where $\omega_{p1}$ and $\omega_{p2}$ are the plasma frequencies of said respective plasmas, $\omega_{c1}$ and $V_{c2}$ are the cyclotron frequencies of said respective plasmas and $\omega$ is the helicon wave frequency;

and wherein a current is caused to flow in each of said media such that the Doppler-shifted dielectric constant $$K_1\left(1-\frac{V_1}{V\phi}\right)$$

of said first plasma is greater than the Doppler-shifted dielectric constant $$K_2\left(1-\frac{V_2}{V\phi}\right)$$

of said second plasma, where $V_1$ and $V_2$ are the drift velocities of said currents in said first and second media respectively; and $V\phi$ is the phase velocity of said helicon wave in said amplifier.

5. In an electromagnetic wave transmission system:

an electromagnetic wave supporting transmission path;

means for amplifying electromagnetic wave energy propagating along said path comprising at least two dissimilar one-component plasma supporting materials located along said wave path;

said material being located adjacent to each other to define a plasma-plasma interface which extends longitudinally along said wave path;

means for coupling said electromagnetic wave energy to and from said amplifying means;

means for establishing a steady longitudinal magnetic field through said materials;

and means for producing a longitudinal current flow through at least one of said materials characterized in that the differential drift current through the two dissimilar materials exceeds the critical value above which amplification occurs.

6. The combination according to claim 5 wherein said wave path comprises a section of conductively bounded waveguide.

7. The combination according to claim 5 wherein said wave path comprises a section of coaxial cable.

8. The combination according to claim 5 wherein said coupling means comprises an element of material at each end of said amplifier;

each of said elements having an effective dielectric constant which gradually increases from a minimum at its outermost end to a maximum value at its innermost end adjacent to said materials.

References Cited by the Examiner

UNITED STATES PATENTS 3,274,406 9/1966 Sommers ............. 330—5

ROY LAKE, *Primary Examiner.*

D. R. HOSTETTER, *Assistant Examiner.*